_United States Patent_ [19]

Orlandea

[11] 4,452,495

[45] Jun. 5, 1984

[54] DRIVE SPROCKET AND TRACK CONFIGURATION

[75] Inventor: Nicolae V. Orlandea, Romania, Iowa

[73] Assignee: Deere & Company, Moline, Ill.

[21] Appl. No.: 371,085

[22] Filed: Apr. 23, 1982

[51] Int. Cl.³ .............................................. B62D 55/20
[52] U.S. Cl. ...................................... 305/11; 305/53; 305/57; 474/156
[58] Field of Search ................ 305/11, 39, 53, 54, 305/57; 474/152–156

[56] References Cited

U.S. PATENT DOCUMENTS

| | | | |
|---|---|---|---|
| 1,261,082 | 4/1918 | White | |
| 1,402,186 | 1/1922 | Stahl | 305/39 X |
| 2,080,675 | 5/1937 | Sponseller | 301/44 |
| 2,854,294 | 9/1958 | Bannister | 305/10 |
| 3,261,646 | 7/1966 | Pax | 305/35 |
| 3,333,903 | 8/1967 | Orr et al. | 305/53 |
| 3,542,439 | 11/1970 | Joos | 305/34 |
| 3,847,451 | 11/1974 | Freedy et al. | 305/54 |
| 4,027,925 | 6/1977 | Black et al. | 305/46 |
| 4,262,972 | 4/1981 | Falk | 305/35 |
| 4,303,278 | 12/1981 | Fehling | 305/35 |

FOREIGN PATENT DOCUMENTS

| | | | |
|---|---|---|---|
| 35019 | 5/1950 | Poland | 305/57 |
| 474714 | 11/1937 | United Kingdom | 305/57 |

_Primary Examiner_—David A. Scherbel

[57] ABSTRACT

A drive sprocket includes a plurality of equispaced rollers which mesh with complementary shaped receptacles defined by surface portions of drive lugs of adjacent sections of a track. The surface portions of adjacent drive lugs leave a gap at the bottom of the receptacle defined thereby for permitting material such as mud or snow and the like to be pushed therethrough by the sprocket rollers. The axis of pins interconnecting adjacent track sections is aligned with the axis of a sprocket roller when the roller is located in the receptacle formed by the drive lugs of the adjacent track sections.

2 Claims, 4 Drawing Figures

DRIVE SPROCKET AND TRACK CONFIGURATION

BACKGROUND OF THE INVENTION

The present invention relates to final drive systems for track laying vehicles and more particularly relates to drive sprocket and track configurations of such drive systems.

Conventionally, track laying vehicles are provided with endless tracks including a plurality of link sections pivotally interconnected with each other by pin and bushing assemblies. The drive sprockets of these vehicles are provided with a plurality of teeth having receptacles located therebetween for receiving the track bushings therein so as to impart a driving force to the chain.

While the drive sprocket and track configuration of the conventional track laying tractors give satisfactory results as concerns their ability to power the vehicles over the ground, these systems have the following disadvantages:

1. There is a considerable impact between the track bushing and the sprocket at the beginning of their contact with each other.
2. Mud, snow and other materials pack in the roots of the receptacles defined by the sprocket teeth.
3. There is excessive wear of the track bushings and the sprocket teeth.

SUMMARY OF THE INVENTION

According to the present invention there is provided a novel drive sprocket and track configuration. Specifically, there is provided a track having link sections interconnected by pivot pins, with adjacent link sections being provided with surfaces curved accurately about the pivotal axis of the pins interconnecting the sections so as to form receptacles. A drive sprocket has a plurality of track-engaging members in the form of rollers arranged for engaging and being shaped complementary to the receptacles formed by adjacent link sections, with the axis of a given roller being coaxial with the pivotal axis of the adjacent link sections when the roller is received within the receptacle formed by the link sections. A gap exists in the root area of the receptacles for permitting material to be extruded therethrough by the action of the sprocket rollers whereby material packing or build-up is prevented.

It is a broad object of the invention to provide a drive sprocket and track configuration which overcomes one or more of the above-noted disadvantages associated with conventional drive sprocket and track configurations.

A more specific object of the invention is to provide a sprocket having a plurality of rollers arranged for driving engagement with complementary receptacles formed by curved surfaces on adjacent track sections of an endless track, with the interengaging parts of the sprocket and track being chosen such that each sprocket roller rolls into engagement with a receptacle and thereby minimizing impact and wear.

Another object of the invention is to provide a track formed of sections which are pivotally interconnected with adjacent sections defining receptacles for receiving sprocket rollers and having gaps in their respective root portions for allowing material to be forced therethrough so as to avoid material buildup.

These and other objects will become apparent from a reading of the ensuing description together with the appended drawings.

DESCRIPTION OF THE PREFERRED EMBODIMENT

Figure 1:
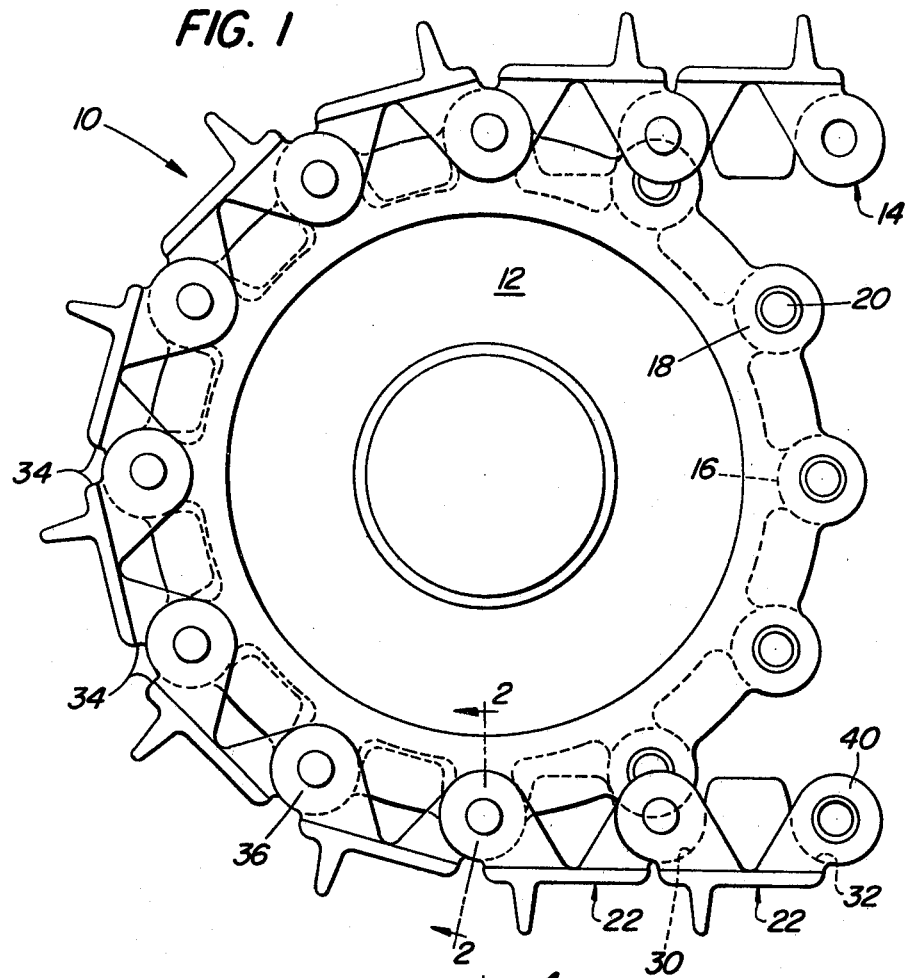
FIG. 1 is a side elevational view of a sprocket and track chain arrangement constructed in accordance with the principles of the present invention.
Figure 2:
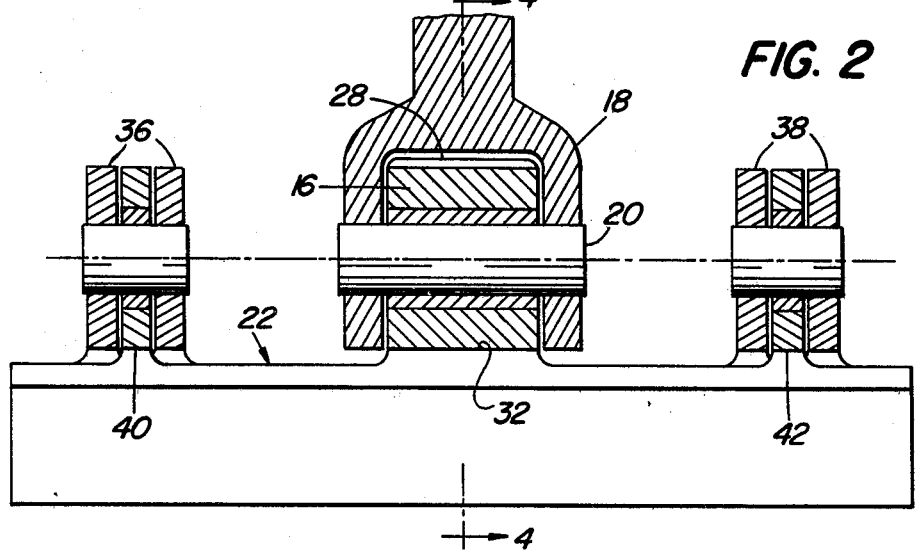
FIG. 2 is a sectional view taken along line 2—2 of FIG. 1.

Referring now to FIGS. 1 and 2, therein is shown a track laying tractor drive portion 10 comprising a final drive sprocket 12 with which is meshed a track chain 14. The sprocket 12 includes a plurality of equispaced track-engaging rollers 16 mounted in a bifurcated outer sprocket portion 18 by means of pins 20.

Figure 3:
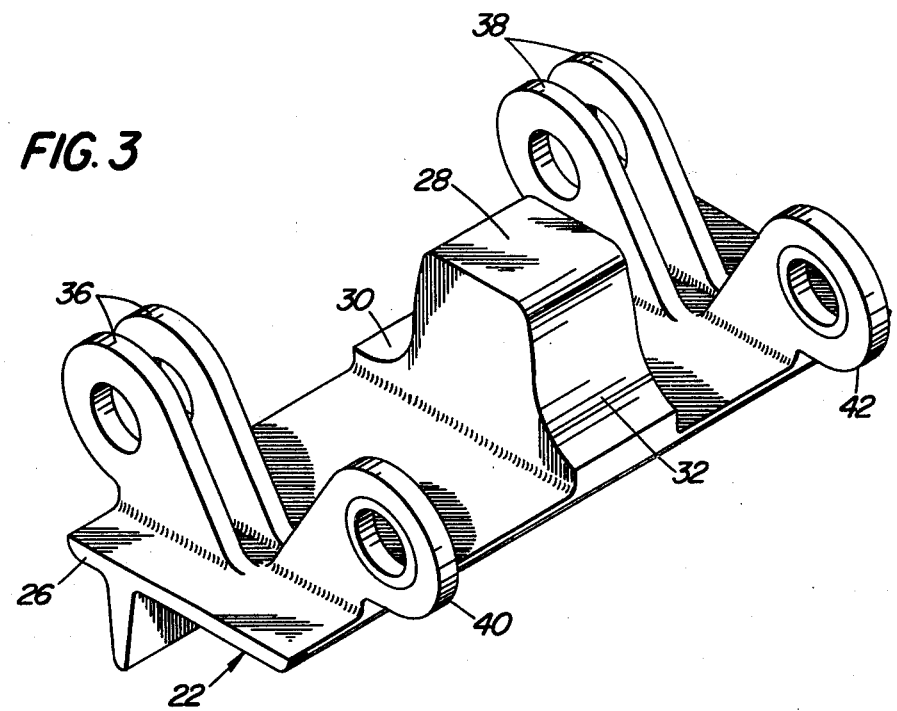
FIG. 3 is a perspective view of a link section of the present invention.
Figure 4:
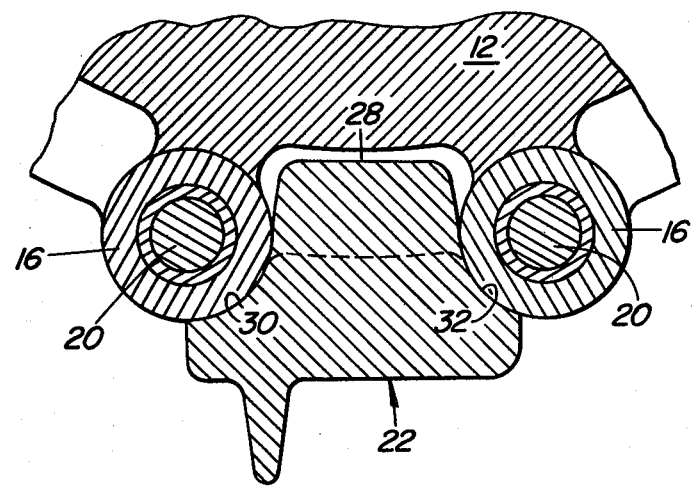
FIG. 4 is a vertical sectional view taken along line 4—4 of FIG. 2.

The track chain 14 comprises a plurality of track sections 22. As can best be seen in FIGS. 3 and 4, the track sections 22 each include a grouser plate 26 having a sprocket roller-engaging lug 28 projecting upwardly from the top thereof at a location midway between opposite ends thereof. Leading and trailing surface portions 30 and 32, respectively of the lug are curved arcuately at a radius equal to the radius of the rollers 16, with the leading surface portion 30 of one track section 22 cooperating with the trailing surface portion 32 of an adjacent track section to form a receptacle for receiving a sprocket roller as the chain moves about the sprocket. The complementary shaped rollers 16 and surface portions 30 and 32 result in there being a correct driving engagement therebetween, with the roller profile being large enough to ensure continuity of motion. Furthermore, tangential forces generated by friction between the rollers and the surface portions 30 and 32 will rotate the rollers, which results in uniform wear of the rollers and surface portions. Also, it should be noted that worn rollers may be replaced without disassembling the track. Referring once again to FIG. 1, it can be seen that a gap 34 exists in the bottom of the receptacle and acts to permit material such as mud of snow and the like to be pushed therethrough by the sprocket rollers so as to eliminate material build-up or packing.

The track sections 22 further include first and second pairs of lugs 36 and 38 respectively fixed to a leading portion of the upper surface of the grouser plate adjacent the opposite ends of the plate. Fixed to a trailing portion of the upper surface of the grouser plate is a pair of bushing-carrying lugs 40 and 42 which are respectively located for reception between the first and second pairs of lugs 36 and 38 of an adjacent section. Respective pins 44 are received in the lugs 36 and 38 of a first track section and pass through bushings located in the lugs 40 and 42 of an adjacent track section so as to establish a pivotal connection between the adjacent sections. It is important to note that when one of the sprocket rollers 16 is properly seated within a receptacle formed by the lugs 28 of ajacent track sections, the axis of the pivotal connection between the adjacent sections will be aligned with the axis of the one sprocket roller.

The operation of the invention is thought to be evident from the foregoing description and for the sake for brevity is not repeated here.

I claim:

1. An endless track, adapted for use with a drive sprocket having a plurality of teeth defined by rotatably mounted rollers, comprising: a plurality of track sections; pivot pin means pivotally interconnecting adjacent ends of adjacent sections for flexure about a pivot axis; and said adjacent ends having respective sprocket roller-engaging surfaces formed arcuately about said pivot axis and dimensioned for simultaneously embracing a sprocket roller when the latter moves into a position wherein it is coaxial with said pivot axis.

2. An endless track as defined in claim 1 wherein said respective sprocket-engaging surfaces are spaced from each other so as to define a relief gap for permitting material to be forced therethrough as the chain moves into meshed engagement with a sprocket.

* * * * *